Oct. 22, 1968　　　　　E. C. HARTUNG　　　　　3,407,335
OVERVOLTAGE RESPONSIVE CONTROL FOR SHUNT PROTECTIVE CIRCUIT
Filed Feb. 7, 1966
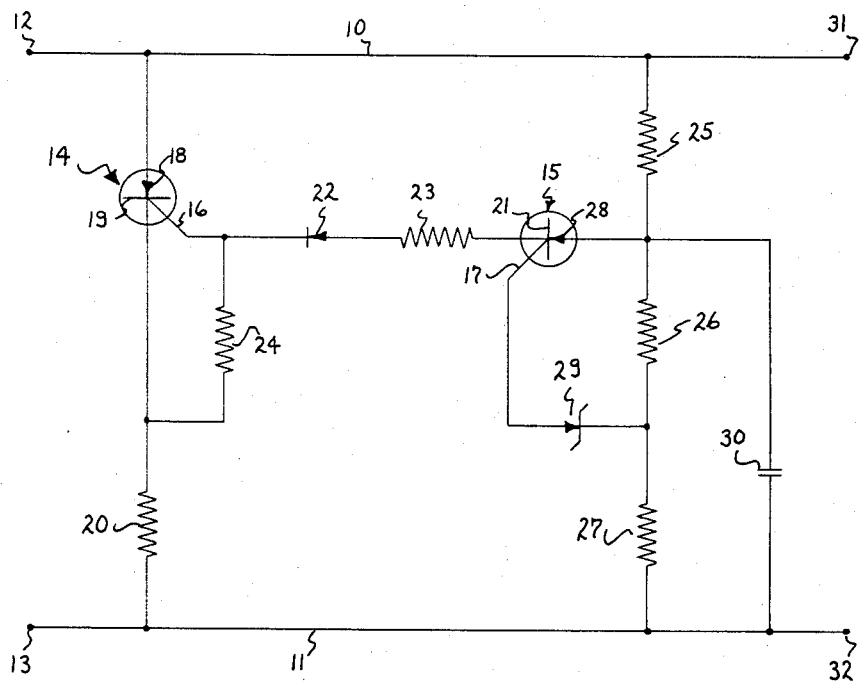
INVENTOR.
EDWARD C. HARTUNG
BY
HIS ATTORNEY United States Patent Office 3,407,335
Patented Oct. 22, 1968

3,407,335
OVERVOLTAGE RESPONSIVE CONTROL FOR
SHUNT PROTECTIVE CIRCUIT
Edward C. Hartung, Elnora, N.Y., assignor to General
Electric Company, a corporation of New York
Filed Feb. 7, 1966, Ser. No. 525,622
6 Claims. (Cl. 317—16)

ABSTRACT OF THE DISCLOSURE

An overload protective circuit has a primary protective discharge path shunting two transmission lines serving apparatus to be protected and including a series-connected discharge path shunting two transmission lines serving apparatus to be protected and including a series-connected discharge resistance and a first silicon-controlled rectifier. The sensing and trigger circuit features a second SCR coupled to the gate of the first SCR and being controlled itself by a Zener diode connected to a resistance divider network shunting the transmission lines. The anode of the second SCR is connected to an intermediate point on the resistance divider and the cathode thereof is connected to the junction between the discharge resistance and the cathode of the first SCR. In operation the second SCR becomes abruptly conductive in response to an overvoltage condition sensed by the Zener diode and provides a firing impulse to the first SCR, turning the latter to its highly conductive state and also thereby reversing the voltage across the second SCR which thereupon rapidly returns to a state of readiness. Short circuit failure of any of the semiconductive components results in shunting the lines with the discharge resistance. Also, when needed, a capacitance is used to bridge a portion of the resistance divider to bypass brief transient voltages, rendering the control circuit relatively insensitive thereto.

---

This invention pertains to voltage sensing circuits and, more particularly, relates to overvoltage responsive circuits of this kind adapted to trigger a protective or safety device.

It is oftentimes desirable or necessary to provide a circuit that senses the magnitude of an electric voltage and responds with an output signal whenever the magnitude of the sensed voltage exceeds a predetermined value. Circuits of this kind are particularly adapted for use with automatic protective, safety or alarm systems, for example, which either perform or indicate the need for corrective action to avoid a potentially dangerous or harmful condition.

For any one or more of many well-known reasons, it is frequently advantageous to utilize solid-state circuit components, usually of the semiconductive kind. Such components give long, useful service in most applications. Experience has proved that most failures of semiconductive devices can be expected to occur in the short circuit, or highly conductive, mode. Because it is preferable in most cases to unnecessarily trigger corrective action rather than not to respond when necessary, the sensing circuit is desirably "fail-safe" to the extent that a short circuit in one or more of the semiconductive devices still enables or causes a response to be made. Also, sensing circuits of the kind contemplated herein should be positive and decisive in operation, should not be unduly sensitive to the normal brief transient disturbances ordinarily encountered, and should rapidly return to a state of continued readiness after making a response.

Accordingly, it is an object of this invention to provide an overvoltage sensing circuit using solid-state components and featuring operation that is not defeated by short circuit failure of the solid-state components.

Another object of this invention is to provide a shunt overvoltage protective system having a sensing circuit that is positive in operation and relatively insensitive to brief transient line disturbances.

Still another object of this invention is to provide a shunt overvoltage protective system having a sensing circuit featuring a switching semiconductive device that rapidly returns to a state of readiness after providing a signal indicative of overvoltage condition.

Briefly, the foregoing objects and others that will become apparent are achieved in one embodiment of the invention by providing a protective system having a primary protective discharge path shunting two transmission lines serving apparatus to be protected and including a series-connected discharge resistance and a first silicon-controlled rectifier (SCR). The sensing and trigger circuit features a second SCR coupled to the gate of the first SCR and being controlled itself by a Zener diode connected to a resistance divider network shunting the transmission lines. The anode of the second SCR is connected to an intermediate point on the resistance divider and the cathode thereof is connected to the junction between the discharge resistance and the cathode of the first SCR. In operation the second SCR becomes abruptly conductive in response to an overvoltage condition sensed by the Zener diode and provides a firing impulse to the first SCR, turning the latter to its highly conductive state and also thereby reversing the voltage across the second SCR which thereupon rapidly returns to a state of readiness. Short circuit failure of any of the semiconductive components results in shunting the lines with the discharge resistance. Also, when needed, a capacitance is used to bridge a portion of the resistance divider to bypass brief transient voltages, rendering the control circuit relatively insensitive thereto.

While the specification concludes with claims particularly pointing out and distinctly claiming the subject matter which is regarded as the invention, it is believed the invention will be better understood from the following description taken in conjunction with the accompany drawing wherein the figure is a schematic circuit diagram of a shunt protective system illustrating the currently preferred embodiment of the present invention.

Shunt protective systems of the general kind to which this invention pertains can take the form described in U.S. Patent No. 3,098,959, Rosenberry, the disclosure of which is intended to be incorporated herein by reference, or as set forth in copending application Ser. No. 323,773, filed Nov. 14, 1963, entitled Excitation System for a Synchronous Generator, and assigned to the assignee of the present invention. Both of the foregoing describe protective circuits having a gate-controlled switchable semiconductive device connected across, or shunting, a pair of transmission lines and adapted to provide a low resistance conductive path shunting the lines in response to an overvoltage condition. The various commutation means, or means for switching the semiconductive device back to its relatively nonconducting state, described therein can be employed with the present invention and will not be further described herein in the interest of more succinctly setting forth the instant invention which is an improved overvoltage sensing circuit for triggering the semiconductive device to its relatively conducting state.

The shunt high-voltage protective circuit shown in the illustrative embodiment protects apparatus connected to a pair of electric power transmission lines, or conductors, 10 and 11. Input terminals 12 and 13 of lines 10 and 11, respectively, are adapted to be connected to a suitable source of power, for example, a three-phase bridge rectifier in such a manner that terminal 12 is maintained at a positive potential relative to terminal 13. There are provided first and second semiconductive devices depicted as controlled rectifiers (SCR) 14 and 15. SCR's 14 and 15 each include gate electrodes 16 and 17, respectively, and are responsive to a trigger current applied to the gate electrodes to switch from a state of relatively low conductivity to a state of relatively high conductivity. Of course, other suitable semiconductive devices of like characteristics, for example, the triac, can be substituted for SCR's 14 and 15.

The anode 18 of SCR 14 is connected to line 10 and the cathode 19 thereof is connected to a discharge resistance 20. The other end of resistance 20 is connected to line 11. In this way, a discharge path shunting lines 10 and 11 through resistor 20 is provided whenever SCR 14 switches to its state of relatively high conductivity.

SCR 14 is controlled by a trigger circuit including SCR 15. As shown, the cathode 21 of SCR 15 is connected through a protective diode 22 and resistance 23 to gate 16 of SCR 14. The connection is such that the cathode of diode 22 is connected to gate 16. Gate 16 is, in turn, connected to the junction between SCR cathode 19 and resistance 20 through a resistance 24.

Voltage sensing means for controlling SCR 15 include a resistance divider having series-connected resistances 25, 26 and 27 connected in the order mentioned from line 10 to line 11. Anode 28 of SCR 15 is connected to the junction of resistances 25 and 26 and gate 17 of SCR 15 is connected to the junction between resistances 26 and 27 through a Zener diode 29. The circuit is completed by a capacitance 30 connected from the junction of resistances 25 and 26 to line 11.

In operation, SCR's 14 and 15 are normally in their relatively nonconductive states. Cathode 21 of SCR 15 is conductively coupled to line 11 through a path including resistance 23, diode 22, resistance 24 and discharge resistance 20. Accordingly, whenever the voltage across resistance 27 exceeds the breakdown voltage of Zener diode 29, a resulting signal is provided to gate 17 to abruptly switch SCR 15 to its conductive state. The ratio between the resistance magnitude of resistance 27 and the total resistance of the resistance divider network is selected so that this event occurs whenever the voltage of line 10 relative to line 11 exceeds a predetermined magnitude at which shunt protective action is necessary or desirable.

When SCR 15 becomes conductive, a pulse is transmitted through resistance 23 and diode 22 to gate 16 of SCR 14, abruptly switching the latter to its relatively conductive state. SCR 14 upon becoming conductive establishes the desired protective shunt discharge path through resistance 20, thereby diverting current between lines 10 and 11 before damage occurs to the source of power connected to terminals 12 and 13 or the power utilization means, as a dynamoelectric machine field, for example, connected to output terminals 31 and 32.

Commutation or turning off, of SCR 15, is achieved when SCR 14 becomes conductive because cathode 19 of the latter quickly assumes a potential substantially equivalent to that of line 10 and less therefrom only by the relatively small voltage drop across the conducting SCR 14. Thus, SCR 15 is back-biased and quickly assumes a state of relatively high conductivity in readiness for another cycle of operation.

The protective discharge path is established whenever line 10 is of positive polarity relative to line 11 and a short circuit failure happens to occur in SCR 14, SCR 15 or voltage reference diode 29. Short circuit failure of diode 22 still enables the protective operation to occur. Thus, the present invention permits a highly reliable protective service to be performed.

In one specific embodiment of the invention a large generator field winding is protected against voltage excursions in excess of approximately 600 volts by a circuit as illustrated and described with the components detailed below.

SCR:
  14 _____ 6RW59RY
  15 _____ 2N2327
Diode:
  22 _____ IN560
  29 _____ IN758A
Resistance:
  20 _____ ohms__ 2.5
  23 _____ do____ 390
  24 _____ do____ 27
  25 _____ do____ 60K
  26 _____ do____ 22K
  27 _____ do____ 1.5
Capacitance 30 _____ mfd__ .05

While I have shown and described the presently preferred embodiment of this invention, many modifications and variations thereof will occur to those skilled in the art. For example, discharge resistance 20 can be omitted from the circuit and cathode 19 of SCR connected directly to line 11, all as set forth in the aforementioned Rosenberry patent. In this case, commutation of SCR 15 is achieved by the additional voltage drop of diode 22 in series therewith, for example. Resistance 23 can be provided equally well in the anode circuit of SCR 15 rather than in the cathode circuit thereof as illustrated, in many cases. Also, while capacitance 30 is highly desirable for the purposes of bypassing brief transient disturbances to which it is not desired the protective circuit be responsive and for providing stored energy enabling a more positive response of the circuit, this capacitance can be omitted where these objects are not desired or required. Accordingly, while I have explained the principle of my invention and have illustrated and described what I now consider to represent its best embodiment according to the provisions of the patent statutes, I desire to have it understood that within the scope of the appended claims, the invention may be practiced otherwise than as specifically illustrated and described.

What I claim as new and desire to secure by Letters Patent of the United States is:

1. A shunt high-voltage protective circuit comprising:
   (a) a first and a second semiconductor controlled rectifier each having an anode, a cathode and a gate electrode and responsive to a trigger current applied to said gate electrode to switch from a state of relatively low conductivity to a state of relatively high conductivity;
   (b) a discharge path including said first controlled rectifier shunting an electric circuit to be protected;
   (c) a trigger circuit including said second controlled rectifier conductively coupled to the gate of said first controlled rectifier and providing a trigger current thereto in response to switching of said second controlled rectifier from the low to the high conductivity state;
   (d) a voltage breakdown semiconductive device conductively coupled from the gate electrode of said second controlled rectifier to a voltage divider network shunting said electric circuit and responsive to departures of the voltage across said electric circuit above a predetermined magnitude to provide a trigger current to the gate electrode of said second controlled rectifier.

2. The protective circuit of claim 1 wherein said discharge path includes a discharge resistance in series circuit relationship with said first device and connected to the cathode thereof.

3. The protective circuit of claim 2 wherein the cathode of said second device is connected to the gate electrode of said first device and a resistance interconnecting the gate electrode of said first device and the cathode thereof.

4. The circuit of claim 3 wherein said resistance divider comprises three series resistances with a first of said resistances interconnecting the anodes of said devices and a second of said resistances connected from the anode of said second device to said voltage breakdown device.

5. The circuit of claim 4 wherein a capacitance shunts said second and a third of said resistances to provide a filter and greater energy for triggering said first device.

6. The circuit of claim 5 wherein a protective diode and resistance effect the connection of the cathode of said second device to the gate electrode of said first device.

References Cited

UNITED STATES PATENTS

| | | | |
|---|---|---|---|
| 3,263,128 | 7/1966 | White | 317—33 |
| 3,317,792 | 5/1967 | Sutherland | 317—33 X |
| 3,341,763 | 9/1967 | Noddin | 317—16 X |

LEE T. HIX, *Primary Examiner.*

J. D. TRAMMELL, *Assistant Examiner.*